United States Patent
Fritsch

(10) Patent No.: US 7,861,519 B2
(45) Date of Patent: Jan. 4, 2011

(54) PROCEDURE TO OPERATE AN EXHAUST GAS TREATMENT DEVICE AND DEVICE TO IMPLEMENT THE PROCEDURE

(75) Inventor: Andreas Fritsch, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 1049 days.

(21) Appl. No.: 11/599,894

(22) Filed: Nov. 14, 2006

(65) Prior Publication Data

US 2007/0110635 A1    May 17, 2007

(30) Foreign Application Priority Data

Nov. 16, 2005    (DE) .................. 10 2005 054 579 U

(51) Int. Cl.
*F01N 3/00*    (2006.01)

(52) U.S. Cl. .............. 60/286; 60/274; 60/277; 60/295; 60/301; 60/303

(58) Field of Classification Search .............. 60/274, 60/277, 285, 286, 295, 301, 303
See application file for complete search history.

(56) References Cited

U.S. PATENT DOCUMENTS

| | | | |
|---|---|---|---|
| 5,628,186 A * | 5/1997 | Schmelz ..................... | 60/274 |
| 5,938,715 A | 8/1999 | Zhang et al. | |
| 6,119,448 A * | 9/2000 | Emmerling et al. .......... | 60/274 |
| 6,698,191 B2 * | 3/2004 | Xu et al. ..................... | 60/286 |
| 6,959,540 B2 * | 11/2005 | Itoh et al. ................... | 60/286 |
| 7,418,816 B2 * | 9/2008 | Upadhyay et al. ............ | 60/285 |
| 7,546,728 B2 * | 6/2009 | Ripper et al. ................ | 60/286 |

FOREIGN PATENT DOCUMENTS

| | | |
|---|---|---|
| DE | 44 26 020 A1 | 2/1996 |
| DE | 197 14 293 C1 | 9/1998 |
| DE | 199 06 287 A1 | 8/2000 |
| DE | 101 13 010 A1 | 9/2002 |
| WO | WO 2004/109072 A1 | 12/2004 |

* cited by examiner

*Primary Examiner*—Tu M Nguyen
(74) *Attorney, Agent, or Firm*—Merchant & Gould P.C.

(57) ABSTRACT

A procedure to operate an exhaust gas treatment device, which contains a catalytically active surface for the exothermic conversion of a reagent substance, and a device to implement the procedure are proposed. Provision is made to measure a first measurement for the reaction temperature of the reagent substance in the area of the catalytically active surface as well as to calculate a second measurement for the reaction temperature using a model of the catalytically supported reaction. A measurement for the unconverted reagent substance in the area of the catalytically active surface is ascertained from a comparison of the two measurements. The procedural approach according to the invention makes possible on the one hand a protection of the exhaust gas duct components with regard to an excessive temperature and on the other hand an energy efficient heating of the exhaust gas duct components.

14 Claims, 2 Drawing Sheets

PROCEDURE TO OPERATE AN EXHAUST GAS TREATMENT DEVICE AND DEVICE TO IMPLEMENT THE PROCEDURE

TECHNICAL FIELD

The invention proceeds from a procedure to operate an exhaust gas treatment device and from a device to implement the procedure according to the class of the independent claims.

BACKGROUND

In the German patent DE 199 06 287 A1 a procedure to operate a particle filter of an internal combustion engine is described, which from time to time is regenerated. The regeneration occurs as a function of a measurement for the degree of depletion of the particle filter. If the sooty particles are not conditioned, the particles oxidize from a temperature of about 550° forward. The required ignition temperature of the particles can, for example, thereby be achieved, when a reagent substance, for example, non-combusted hydrocarbons, is introduced into the exhaust gas area of the internal combustion engine. This reagent substance reacts exothermally on a catalytic surface area and thereby raises the exhaust gas temperature.

In the German patent DE 101 13 010 A1 a procedure is described to diagnose an exhaust gas treatment system disposed in the exhaust gas area of an internal combustion engine, in which the temperature of the exhaust gas is measured in each case by a sensor in front of and after the exhaust gas treatment system. The diagnosis is based upon an expected increase in temperature of the exhaust gas, if the exhaust gas contains non-combusted hydrocarbons, which react exothermally on a catalytically active surface. An error free exhaust gas treatment system is present, if an expected increase in the temperature measured behind the exhaust gas treatment system occurs due to an increase of the proportion of non-combusted hydrocarbons in the exhaust gas of the internal combustion engine. The diagnosis only occurs then, as long as provision is made for the introduction of the non-combusted hydrocarbons. Furthermore, the diagnosis only occurs, if the temperature measured in front of the exhaust gas treatment system does not change considerably within a certain time period during the introduction of the non-combusted hydrocarbons.

In the German patent DE 44 26 020 A1 a procedure is described, in which the functional capability of a catalytic converter disposed in the exhaust gas area of an internal combustion engine is monitored. The monitoring is implemented by using the temperature increase, which occurs by way of the exothermic conversion of exhaust gas components, which can be oxidized. Two temperatures are ascertained, whereby the first temperature is based upon the measurement of the temperature down stream from the catalytic converter, and the second temperature is calculated with the help of a model.

SUMMARY

The task underlying the invention is to specify a reliable procedure to operate an exhaust gas treatment device and a device to implement the procedure, which minimize the consumption of a reagent substance and most importantly avoid an overheating of the exhaust gas duct components.

The task is solved in each instance by the characteristics specified in the independent claims.

Provision is made to ascertain at least a measurement for the unconverted reagent substance in the procedure according to the invention to operate an exhaust gas treatment device, which contains a catalytically active surface for the exothermic conversion of the reagent substance. The reagent substance stream and/or the amount of reagent substance can, for example, be ascertained as a measurement for the unconverted reagent substance.

The procedural approach according to the invention allows for an intervention into the allocation of the reagent substance specified for oxidation as a function of the measurement for the unconverted reagent substance.

Thereby an unreliably high heating of an exhaust gas duct component, including the catalytically active surface, can be avoided. In so doing, it is already sufficient according to a simple implementation, to decrease the allocation of the reagent substance specified for exothermic conversion, for example within the scope of an oxidation, to a degree equal to the degree that the unconverted reagent substance increases.

The knowledge of the measurement for the unconverted reagent substance can further be drawn upon to optimize the heating of an exhaust gas duct component. The allocation of the reagent substance can with knowledge of the measurement for the unconverted reagent substance be increased to an upper limit value, at which there still exists no danger to an exhaust gas duct component. The exhaust gas duct component can thereby be heated in the shortest possible time and thus in an energy efficient manner.

Advantageous configurations and embodiments of the procedural approach according to the invention result from the dependent claims.

Provision is made in one embodiment to measure the reaction temperature in the area of the catalytically active surface downstream from the catalytically active surface. The disposal of a temperature sensor downstream from the catalytically active surface is generally more simply possible than directly in the area of the catalytically active surface. With this measure a sufficiently accurate measurement for the reaction temperature is maintained with less effort.

Provision is made in one embodiment to take into account the exhaust gas temperature upstream from the catalytically active surface, in order to raise the accuracy when calculating the second measurement for the reaction temperature using a model of the catalytically supported reaction.

Provision is made in one embodiment to intervene into an allocation of the reagent substance as a function of the measurement for the unconverted reagent substance. By means of the intervention, the unconverted reagent substance on the catalytically active surface is taken into account during the metering of the reagent substance; so that a protection, for example, against an inadmissibly high collection of the reagent substance can be guaranteed through a reduction in the allocation or the complete stoppage of a reagent substance metering signal.

Provision can especially be made to calculate an energy corresponding to a complete conversion of the unconverted reagent substance using the measurement for the unconverted reagent substance.

Provision is made in an alternative or additional embodiment to calculate a maximum temperature of the reaction temperature using the measurement for the unconverted reagent substance, which would result from a precipitous complete oxidation of the reagent substance.

It can be estimated with these measures, if an endangering situation for the exhaust duct components, including the catalytically active surface, would occur on account of an inadmissibly high temperature. In the case that an endangering situation exists, a timely intervention into the allocation of the reagent substance can be made in order to avoid the endangering situation.

The knowledge of the measurement for the unconverted reagent substance, of the ascertained energy or of the maximum temperature can not only be drawn upon to implement a protection of the exhaust gas duct components, but also be drawn upon for an increased allocation of the reagent substance, in order to support a quick and/or even exothermic reaction without the danger of overheating to one of the exhaust gas duct components arising.

Provision is made for hydrocarbons, for example, or fuel, for example, to be the reagent substance. The reagent substance, especially hydrocarbons, can, for example, be introduced directly into the exhaust gas area upstream from the catalytically active surface by way of an incomplete combustion of the fuel in the internal combustion engine and/or by way of at least one fuel afterinjection and/or a fuel injection with multiple parts and/or with a metering of the reagent substance.

The device according to the invention to operate an exhaust gas treatment device concerns initially a control unit, which is designed to implement the procedure. The control unit contains preferably at least one electrical storage, in which the procedural steps are deposited as a computer program.

Provision is made in an embodiment for the control unit to contain a catalytic converter model to calculate the measurement for the unconverted reagent substance.

Provision is made in an embodiment to dispose a temperature sensor to ascertain the measured first measurement for the reaction temperature downstream from the catalytically active surface.

Additional advantageous configurations and embodiments of the procedural approach according to the invention result from additional dependent claims and from the following description.

BRIEF DESCRIPTION OF THE DRAWINGS

FIG. 1 shows an internal combustion engine 10, in whose air intake area 11 an air acquisition 12 and in whose exhaust gas area 13 a reagent substance metering 14, a catalytically active surface 15 as well as a particle filter 16 are disposed. In the exhaust gas area 13 an exhaust gas stream ms_abg appears.

DETAILED DESCRIPTION

Figure 1:
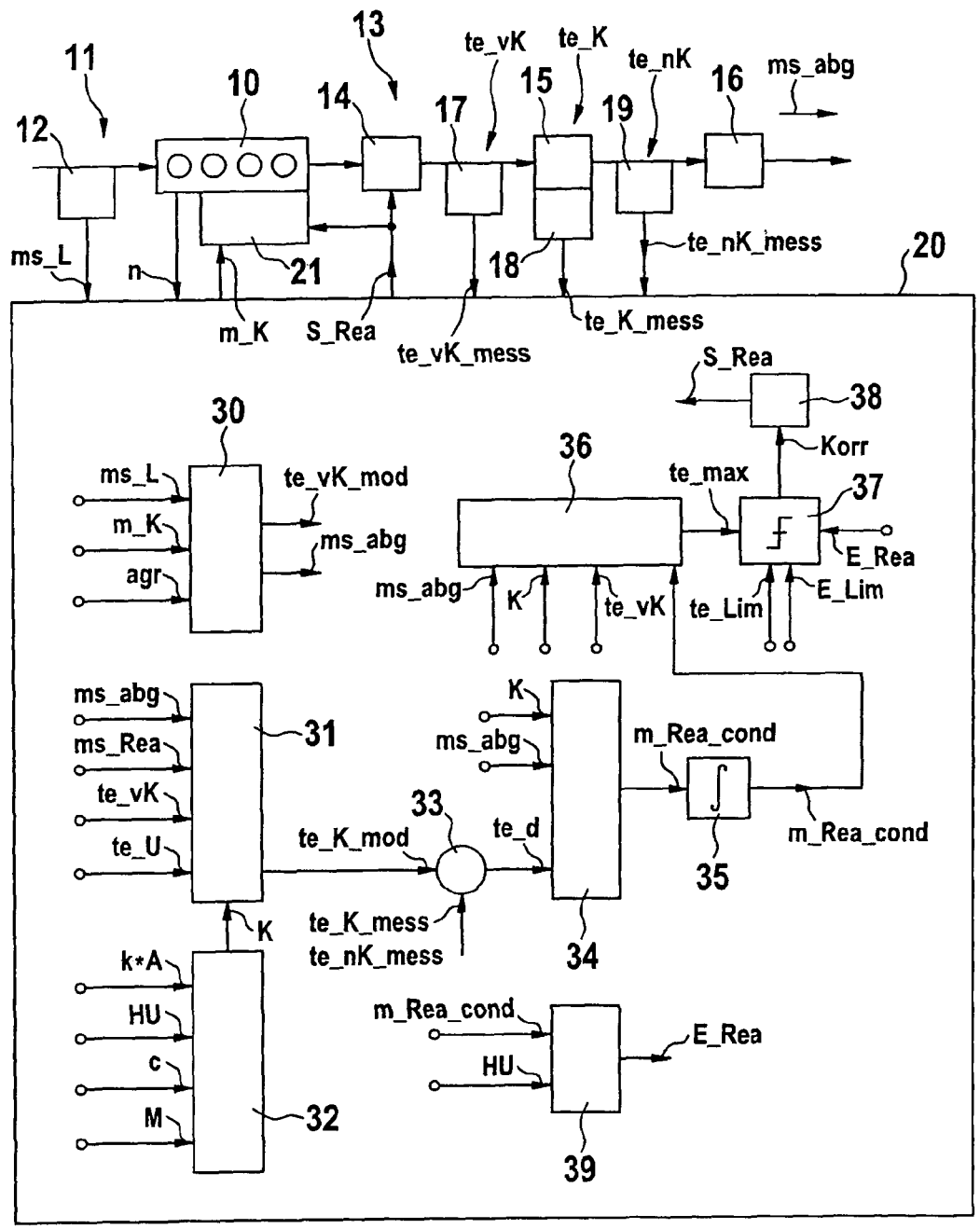
FIG. 1 shows a technical layout in which a procedure according to the invention is operating and FIG. 2 shows temperature progressions as a function of time.

Upstream from the catalytically active surface, a first temperature sensor 17 is disposed, and a second temperature sensor 18 is disposed on the catalytically active surface 15. A third temperature sensor 19 is disposed downstream from the catalytically active surface 15.

The air acquisition 12 provides an air signal ms_L to the control unit 20, and the internal combustion engine provides an engine rotational speed signal n to the control unit 20.

The first temperature sensor 17 acquires an exhaust gas temperature te_vK occurring upstream from the catalytically active surface and provides a first temperature measuring signal te_vK_mess to the control unit 20 as a measurement for the exhaust gas temperature occurring upstream from the catalytically active surface 15.

The second temperature sensor 18 acquires the reaction temperature te_K in the area of the catalytically active surface 15 and provides a second temperature measuring signal to K_mess to the control unit 20 as a measurement for the reaction temperature te_K in the area of the catalytically active surface 15.

The third temperature sensor 19 acquires the reaction temperature te_nK downstream from the catalytically active surface 15 and provides a third temperature measuring signal te_nK_mess to the control unit 20 as a measurement for the reaction temperature te_nK downstream from the catalytically active surface 15.

The control unit 20 provides a fuel signal m_K to the fuel metering 21. Furthermore, the control unit 20 provides a reagent substance signal S_Rea to the reagent substance metering 14 and to the fuel metering 21.

The control unit 20 contains an exhaust gas parameter ascertainment 30, which is provided with the air signal ms_L, the fuel signal m_K as well as an exhaust gas return signal agr and which supplies the exhaust gas stream ms_abg as well as a calculated exhaust gas temperature te_vK_mod upstream from the catalytically active surface 15.

The control unit 20 contains additionally a catalytic converter model 31, which is provided with the exhaust gas stream ms_abg, a reagent substance stream ms_Rea, the exhaust gas temperature te_vK upstream from the catalytically active surface 15, the ambient air temperature te_U and a constant K and which supplies a calculated reaction temperature te_K_mod of the reagent substance converted in the area of the catalytically active surface 15.

The constant K is supplied by a constant ascertainment 32, which is provided with at least a heating transition coefficient k*A, the heating value of the reagent substance HU, at least a heating capacity c as well as at least a mass M.

A summation agent 33 ascertains the difference te_d between the calculated reaction temperature te_K_mod and the measured reaction temperature te_K mess in the area of the catalytically active surface 15 and provides the temperature difference te_d to a reagent substance stream ascertainment 34, which additionally is supplied with the constant K as well as the exhaust gas stream ms_abg and which supplies a reagent substance stream ms_Rea_cond of the reagent substance unconverted on the catalytically active surface 15.

An integrator 35 ascertains the mass or amount m_Rea_cond of the unconverted reagent substance in the area of the catalytically active surface 15 from the reagent substance stream ms_Rea_cond of the reagent substance unconverted on the catalytically active surface and provides a mass/amount m_Rea_cond to a temperature ascertainment 36, which is further provided with the exhaust gas stream ms_abg, the constant K as well as the reaction temperature te_K in the area of the catalytically active surface 15. The temperature ascertainment 35 supplies a maximum temperature te_max.

The maximum temperature te_max is provided to a comparator 37, which compares the maximum temperature te_max with an upper temperature threshold value te_Lim and provides a correction signal Korr to a reagent substance signal establishment 38 as a function of the comparison result. The reagent substance signal establishment 38 supplies the reagent substance signal S_Rea.

The control unit 20 contains additionally an energy ascertainment 39, which is provided with the mass/amount m_Rea_cond of the reagent substance unconverted in the area of the catalytically active surface 15 as well as the heating value of the reagent substance HU and which supplies an energy ERea, which corresponds to a complete conversion of the mass/amount m_Rea_cond of the unconverted reagent substance.

The energy E_Rea is likewise provided to the comparator 37, which compares the energy E_Rea with an upper energy threshold value E_Lim and supplies the correction signal Korr as a function of the comparison result.

The procedure according to the invention operates in the following manner:

The control unit 20 ascertains the fuel signal m_K, which is provided to the fuel metering 21, for example, as a function of the engine rotational speed signal n of the internal combustion engine 10 and/or if need be as a function of the air signal ms_L supplied by the air acquisition 12 and/or if need be as a function of the position of an unspecified accelerator pedal, provided that provision is made for the internal combustion engine to be the power drive 10 in the motor vehicle.

The catalytically active surface 15 disposed in the exhaust gas area 13 as well as the particle filter 16 are components of an exhaust gas treatment device. The catalytically active surface 15 can be contained in a catalytic converter, for example in an oxidation catalytic converter and/or a three-way-catalytic converter and/or a $NO_x$ storage catalytic converter. Furthermore, the catalytically active surface 15 can be contained in a particle filter 16. Provision can be made within the particle filter 16 for the catalytically active surface 15 to be a separate catalytic converter or a coating of the particle filter 16.

The catalytically active surface 15 as well as the particle filter 16 are examples of exhaust gas duct components, which can require an elevated operating temperature as a function of the operating situation. For example, the particle filter 16 must be regenerated from time to time from the collected particles. The regeneration results from a burning off the particles, which begins without conditioning the particles at temperatures above approximately 550 C.

A catalytic converter has a temperature window, within which the catalytically supported reactions operate optimally. Provided that the catalytic converter concerns a storage catalytic converter, for example a $NO_x$-storage catalytic converter, a regeneration is required likewise from time to time. Particularly a desulfurization of the storage catalytic converter, if need be required, is currently implemented at elevated temperatures, for example, above 600° C.

The required temperature is provided by an exothermic reaction, for example an oxidation, of the reagent substance introduced into the exhaust gas area 13 on the catalytically active surface 15. Provision is made for hydrocarbons, for example, to be the reagent substance. The reagent substance can be supplied by measures within the motor as, for example, a degradation of the combustion and/or by at least one fuel afterinjection and/or a fuel injection with multiple parts. In this case the reagent substance signal establishment 38 provides the reagent substance signal S_Rea directly to the fuel metering 21. The reagent substance signal S_Rea is in practice contained in the fuel signal m_K.

Alternatively the reagent substance can be directly sprayed into the exhaust gas area 13 with the reagent substance introduction 14.

The reagent substance signal S_Rea is established as a function of the actual need for the reagent substance, whereby provision is not only made for the reagent substance to be converted in the area of the catalytically active surface 15, but also, for example, provision can be made for the reagent substance to be needed as a regeneration reagent substance.

Provision is made according to the invention to ascertain the measurement te_d, ms_Rea_cond, m_Rea_cond for the unconverted reagent substance in the area of the catalytically active surface 15. In the simplest case, the temperature te_d is suitable as the measurement te_d, ms_Rea_cond, m_Rea_cond. The unconverted reagent substance stream ms_Rea_cond can, for example, additionally be drawn upon as the measurement. Preferably the reagent substance mass and/or the amount of the reagent substance m_Rea_cond is drawn upon as the measurement. This mass and/or amount is received with the integrator 35 from the reagent substance stream ms_Rea_cond.

The unconverted reagent substance can especially collect during dynamic operating conditions of the internal combustion engine 10, which, for example, occur during precipitous load changes. The unconverted reagent substance can collect on cooler exhaust gas duct components in the exhaust gas area 13 due to condensation. This leads to a deterioration of the exhaust gas values and represents especially a danger for the exhaust gas duct components such as the particle filter 16 or the catalytically active surface 15 itself, if the reagent substance is converted precipitously, respectively in the shortest possible time, and a high temperature peak consequently arises.

The measurement te_d, ms_Rea_cond, m_Rea_cond of the unconverted reagent substance on the catalytically active surface 15 corresponds in the simplest case directly to the temperature difference te_d between the calculated reaction temperature te_K_mod and the second temperature measuring signal te_K_mess. An additional measurement te_d, ms_Rea_cond, m_Rea_cond can be ascertained using the temperature difference te_d between the calculated reaction temperature te_K_mod and the second temperature measuring signal te_K_mess.

As previously mentioned, the second temperature sensor 18 can be replaced by the third temperature sensor 19, which is disposed downstream from the catalytically active surface 15. The third temperature measuring signal te_nK mess acquired by the third temperature sensor 19 downstream from the catalytically active surface 15 can be drawn upon at least approximately as a measurement for the reaction temperature te_nK in the area of the catalytically active surface 15. The third temperature sensor 19 can if necessary be disposed in a simple manner downstream from the catalytically active surface 15. From hereon only the reaction temperature te_K, te_nK will be addressed.

In like fashion the first temperature sensor 17 can be omitted, which supplies the first temperature measuring signal te_vK mess as a measurement for the exhaust gas temperature te_vK upstream from the catalytically active surface 15.

The exhaust gas temperature te_vK upstream from the catalytically active surface 15 can alternatively be ascertained by the exhaust gas parameter ascertainment 30 from the air signal ms_L and the fuel signal m_K and maintained as the calculated exhaust gas temperature te_vK_mod upstream from the catalytically active surface 15. If need be, an exhaust gas return rate agr can be taken into account when ascertaining the calculated exhaust gas temperature te_vK_mod.

The exhaust gas parameter ascertainment 30 provides additionally at least one measurement for the exhaust gas stream ms_abg from at least the air signal ms_L. If need be, the fuel signal m_K and/or if need be the exhaust gas return rate agr can be taken into account when ascertaining the exhaust gas stream ms_abg. The exhaust gas stream ms_abg can be ascertained as the exhaust gas volume stream; however, preferably as the exhaust gas mass stream.

Provision is made for the catalytic converter model 31 to ascertain the calculated reaction temperature te_K_mod as a result of the conversion, for example, within the scope of an oxidation reaction or the reagent substance in the area of the catalytically active surface 15. The catalytic converter model 31 calculates the reaction temperature te_K_mod from the exhaust gas stream ms_abg, the reagent substance stream ms_Rea, if need be the exhaust gas temperature te_vK upstream from the catalytically active surface 15 and if need be from the ambient air temperature te_U.

Furthermore, provision is made for the constant K, which is supplied by the constant ascertainment 32, to calculate the reaction temperature te_K_mod. Especially the heating value HU is taken into account with the constant K. Additionally technical heating parameters as, for example, at least one heating transition coefficient k*A, at least one heating capacity c—for example, the heating capacity c of the exhaust gas and/or the heating capacity c of an exhaust gas duct component—as well as at least one mass M of the exhaust gas duct components involved in the heating can be taken into account.

Already on the basis of the measurement te_d, ms_Rea_cond, m_Rea_cond for the unconverted reagent substance, an intervention into the reagent substance signal establishment 38 can be performed by the correction signal Korr, in order to avoid an undesirably high collection of the reagent substance in the exhaust gas area 13 in the area of the catalytically active surface 15 or downstream from the catalytically active surface 15.

Provision is made in the alternative to conduct the intervention by way of the energy E_Rea of the unconverted reagent substance, which has collected. The energy E_Rea indicates that energy, which corresponds to a complete conversion of the reagent substance, which has collected. The energy E_Rea is ascertained by the energy ascertainment 39 from the measurement m_Rea_cond for the unconverted reagent substance and from the heating value HU of the reagent substance.

The reagent substance signal S_Rea can be established directly as a function of the energy E_Rea, which has been ascertained. In the example of embodiment depicted, the correction signal Korr is alternatively provided, if the comparator 37 determines, that the energy E_Rea exceeds the specified upper energy threshold value E_Lim. Provided that this is the case, the reagent substance signal S_Rea can be reduced or completely taken back.

Provision is made in another alternative for an intervention into the reagent substance signal S_Rea as a function of the maximum temperature te_max, which would result from a precipitous, i.e. in the shortest possible time, complete exothermic conversion of the reagent substance, which has collected.

The maximum temperature te_max is ascertained from the temperature ascertainment 36 as a function of the measurement ms_Rea_cond, m_Rea_cond for the unconverted reagent substance on the catalytically active surface 15, from the exhaust gas stream ms_abg, from the constant K and if need be as a function of the exhaust gas temperature te_vK upstream from the catalytically active surface 15.

The maximum temperature te_max can be drawn upon directly in order to influence the reagent substance establishment 38. In the example of embodiment depicted, an intervention into the reagent signal establishment with the correction signal Korr only occurs, if the maximum temperature te_max exceeds the specified upper temperature threshold value te_Lim. Provision can be made for the reagent substance signal Korr to be reduced or completely taken back after the upper temperature threshold value has been exceeded.

Instead of the implementation of a protection of the exhaust gas duct components against an inadmissibly high temperature, provision can be made for the measurement ms_Rea_cond, m_Rea_cond ascertained for the unconverted reagent substance to be designated for a targeted elevation of the reagent substance signal s_Rea, in order, for example, to allow for a rapid temperature elevation of the exhaust gas duct component to be heated. A degradation of security when establishing the reagent substance signal S_Rea can be omitted with the knowledge of the measurement ms_Rea_cond, m_Rea_cond for the unconverted reagent substance.

Figure 2:
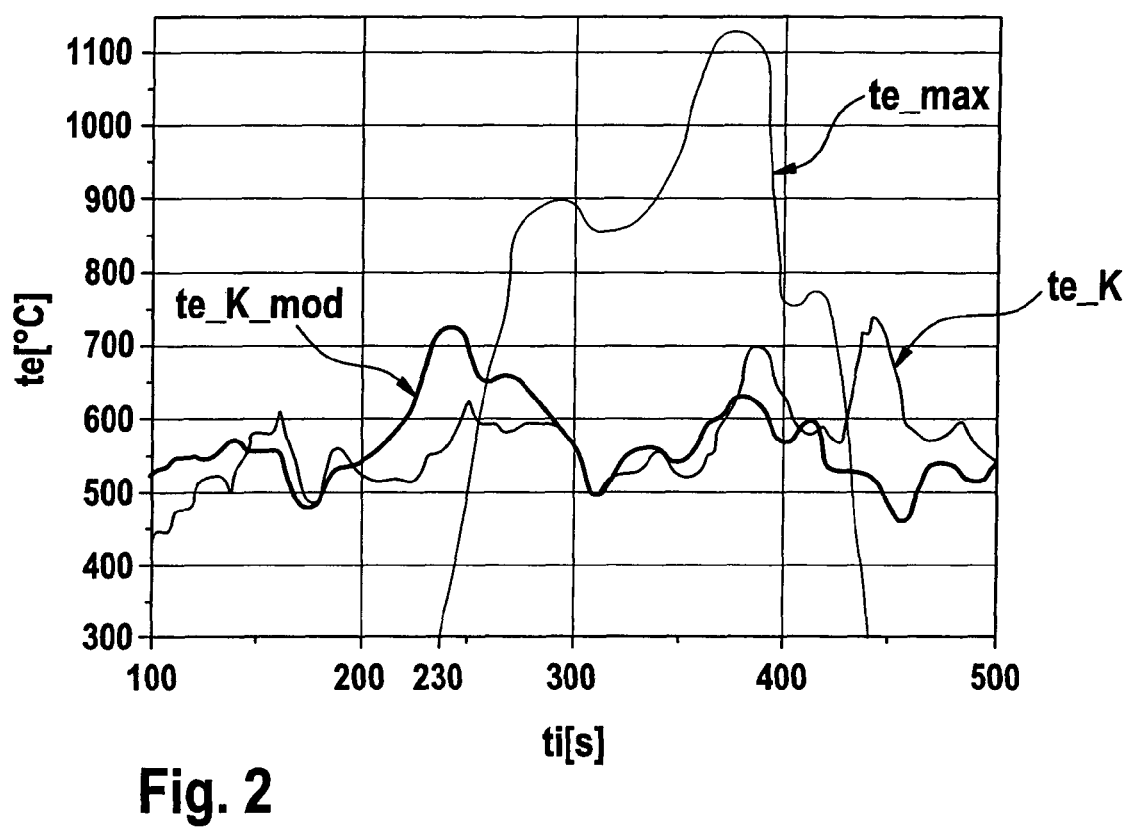

The advantages, which can be achieved with the procedural approach according to the invention, are apparent using the temperature progressions to depicted in FIG. 2 as a function of the time ti. First of all the reaction temperature te_K in the area of the catalytically active surface is reflected in FIG. 2, which the temperature sensor 18 and/or especially the third temperature sensor 19 acquires and provides to the control unit 20 as the second temperature measuring signal te_K_mess, respectively third temperature measuring signal te_nK_mess.

Additionally the calculated reaction temperature te_K_mod is plotted. In the course of the time ti, which, for example, is indicated in seconds, varying operating conditions of the internal combustion engine 10 exist.

From the $200^{th}$ second forward, the calculated reaction temperature te_K_mod lies above the measured reaction temperature te_K. The maximum temperature te_max rises sharply from the $230^{th}$ second forward and reaches approximately 900° C. at the $300^{th}$ second. The maximum temperature te_max rises up until the $380^{th}$ second up over 1100° C. Subsequent to that, an exothermic reaction of the collected reagent substance occurs. The measured reaction temperature te_K rises dramatically from the $440^{th}$ second forward, while the maximum temperature te_max drops again. The measured reaction temperature te_K rises at this point in time to 750° C. in the example of embodiment depicted.

As a temperature measuring signal te_K_mess, te_nK_mess is of concern, it can be assumed, that the actual reaction temperature in the area of the catalytically active surface 15 is higher and amounts to, for example, 950° C. The theoretically calculated peak temperature of the maximum temperature te_max of over 1100° C. does not occur in practice, because the conversion of the collected reagent substance cannot take place infinitely fast. The measured reaction temperature te_K mess, te_nK mess, which rises to 750° C. at the $440^{th}$ second, can, however, damage the catalytically active surface 15 or other exhaust gas duct components.

This operating condition can be reliably prevented with the procedural approach according to the invention. In the case that provision is made according to an example of embodiment to influence the reagent substance signal S_Rea on the basis of the maximum temperature te_max, the upper temperature threshold value te_Lim for the maximum temperature te_max can with a glance at FIG. 2 be established, for example, at 900° C. If the reagent substance signal S_Rea had been reduced or completely taken back from the $300^{th}$ second forward, then the excessive temperature from the $400^{th}$ second forward could have been avoided.

The invention claimed is:
1. A method of operating an exhaust gas treatment device having a catalytically active surface for an exothermic conversion of a reagent substance, the method comprising:
measuring a first measurement for a reaction temperature of a catalytically supported reaction;
calculating a second measurement for the reaction temperature using a model;

determining a third measurement from a comparison of the first and second measurements for an unconverted reagent substance in an area of the catalytically active surface; and calculating a maximum temperature of the reaction temperature from the third measurement for the unconverted reagent substance in the area of the catalytically active surface.

2. A method of operating an exhaust gas treatment device having a catalytically active surface for an exothermic conversion of a reagent substance, the method comprising:

measuring a first measurement for a reaction temperature of a catalytically supported reaction;

calculating a second measurement for the reaction temperature using a model;

determining a third measurement from a comparison of the first and second measurements for an unconverted reagent substance in an area of the catalytically active surface; and calculating an energy from the third measurement for the unconverted reagent substance in the area of the catalytically active surface.

3. A method according to claim 2, wherein the first measurement for the reaction temperature is measured downstream from the catalytically active surface.

4. A method according to claim 2, wherein an exhaust gas temperature upstream from the catalytically active surface is taken into account when calculating the second measurement for the reaction temperature.

5. A method according to claim 2, wherein the energy indicates a complete conversion of the reagent substance.

6. A method according to claim 2, wherein an intervention occurs into a reagent substance establishment as a function of the third measurement.

7. A method according to claim 2, further comprising introducing the reagent substance by way of an incomplete combustion of fuel in an internal combustion engine or by way of at least one fuel afterinjection or by way of a fuel injection with multiple parts or with a reagent substance metering directly into an exhaust gas area upstream from the catalytically active surface.

8. A method according to claim 2, further comprising calculating a maximum temperature of the reaction temperature from the third measurement for the unconverted reagent substance in the area of the catalytically active surface.

9. A method according to claim 8, wherein the maximum temperature results from a complete conversion of the reagent substance.

10. A method according to claim 8, wherein an upper temperature threshold value is specified for the maximum temperature.

11. A device to operate an exhaust gas treatment device having a catalytically active surface for the exothermic conversion of the reagent substance, and at least one control unit for operating the exhaust gas treatment device, the control unit measuring a first measurement for a reaction temperature of a catalytically supported reaction, calculating a second measurement for the reaction temperature using a model, determining a third measurement from a comparison of the first and second measurements for an unconverted reagent substance in an area of the catalytically active surface, and calculating an energy from the third measurement for the unconverted reagent substance in the area of the catalytically active surface.

12. A device to operate an exhaust gas treatment device having a catalytically active surface for the exothermic conversion of the reagent substance, and at least one control unit for operating the exhaust gas treatment device, the control unit measuring a first measurement for a reaction temperature of a catalytically supported reaction, calculating a second measurement for the reaction temperature using a model, determining a third measurement from a comparison of the first and second measurements for an unconverted reagent substance in an area of the catalytically active surface, and calculating a maximum temperature of the reaction temperature from the third measurement for the unconverted reagent substance in the area of the catalytically active surface.

13. A device according to claim 12, wherein the control unit contains a catalytic converter model to determine the third measurement for the unconverted reagent substance on the catalytically active surface.

14. A device according to claim 13, further including a temperature sensor to acquire the first measurement for the reaction temperature in the area of the catalytically active surface, the temperature sensor being disposed downstream from the catalytically active surface.

* * * * *

UNITED STATES PATENT AND TRADEMARK OFFICE
CERTIFICATE OF CORRECTION

PATENT NO. : 7,861,519 B2
APPLICATION NO. : 11/599894
DATED : January 4, 2011
INVENTOR(S) : Fritsch Page 1 of 1

It is certified that error appears in the above-identified patent and that said Letters Patent is hereby corrected as shown below:

Col. 4, lines 3-4: "signal to K_mess" should read --signal te_K_mess--

Col. 8, line 12: "progressions to depicted" should read --progressions te depicted--

Signed and Sealed this
Fourteenth Day of June, 2011

David J. Kappos
*Director of the United States Patent and Trademark Office*